United States Patent [19]
VanDoren et al.

[11] Patent Number: 5,638,538
[45] Date of Patent: Jun. 10, 1997

[54] TURBOTABLE: APPARATUS FOR DIRECTING ADDRESS AND COMMANDS BETWEEN MULTIPLE CONSUMERS ON A NODE COUPLED TO A PIPELINED SYSTEM BUS

[75] Inventors: Stephen R. VanDoren; Denis J. Foley, both of Shrewsbury; Maurice B. Steinman, Marlborough, all of Mass.

[73] Assignee: Digital Equipment Corporation, Maynard, Mass.

[21] Appl. No.: 372,533

[22] Filed: Jan. 13, 1995

[51] Int. Cl.⁶ .................... G06F 13/00; G06F 12/00
[52] U.S. Cl. ............................. 395/821; 395/800
[58] Field of Search ............... 395/200.01, 200.15, 395/250, 650, 800, 736, 821, 375

[56] References Cited

U.S. PATENT DOCUMENTS

| | | | |
|---|---|---|---|
| 3,643,227 | 2/1972 | Smith et al. | 395/650 |
| 4,449,182 | 5/1984 | Rubinson et al. | 395/250 |
| 4,458,316 | 7/1984 | Fry et al. | 395/250 |
| 4,543,626 | 9/1985 | Bean et al. | 395/200.03 |
| 5,023,776 | 6/1991 | Gregor | 395/449 |
| 5,067,071 | 11/1991 | Schanin et al. | 395/293 |
| 5,136,718 | 8/1992 | Haydt | 395/800 |
| 5,235,685 | 8/1993 | Caldara et al. | 395/308 |
| 5,237,567 | 8/1993 | Nay et al. | 370/85.1 |
| 5,293,620 | 3/1994 | Barabash et al. | 395/650 |
| 5,386,514 | 1/1995 | Lary et al. | 395/250 |
| 5,455,825 | 10/1995 | Lauer et al. | 370/60 |
| 5,459,839 | 10/1995 | Swarts et al. | 395/650 |

*Primary Examiner*—Gopal C. Ray
*Attorney, Agent, or Firm*—Mary M. Steubing

[57] ABSTRACT

A command queueing apparatus for directing address and command information amongst the various interfaces, or consumers, on a multi-CPU node in a computer system. The apparatus includes a core queue containing core queue entries, each core queue entry corresponding to a pending system bus operation. Each core queue entry includes one or more consumer information fields specific to each consumer. Also included is a plurality of virtual queues, each virtual queue corresponding to a consumer, each virtual queue having a virtual queue entry. A virtual queue entry for a consumer is a subset of the fields of a core queue entry, the subset of fields including the consumer information fields for the consumer corresponding to the virtual queue.

14 Claims, 7 Drawing Sheets

TURBOTABLE: APPARATUS FOR DIRECTING ADDRESS AND COMMANDS BETWEEN MULTIPLE CONSUMERS ON A NODE COUPLED TO A PIPELINED SYSTEM BUS

BACKGROUND OF THE INVENTION

The invention relates to computer system bus interfaces and particularly to directing address and command information between multiple interfaces on a node in a computer system.

In a multi-CPU system in which multi-CPU nodes are coupled to a pipelined system bus, multiple system bus transactions may be pending at any given time. In addition, each system bus operation may require data movement on a particular node between the system bus and any of the various interfaces on the node. For example, a given node may have multiple CPU and cache subsystems each coupled to its own CPU interface, a block of control and status registers [CSR's] coupled to a CSR interface, and a system bus interface for coupling the node to the system bus. A given system bus operation may require data movement between any of the CPU or CSR interfaces and the system bus interface, between the system bus interface and the system bus, or both. For example, a system bus operation requiring the transfer of data from the cache in one of the CPU and cache subsystems to the system bus would involve data movement between the CPU interface associated with that cache to the system bus interface, and then from the system bus interface to the system bus.

For such a multi-CPU node, some way must be provided for directing address and command information between the system bus and the various interfaces on the node for each outstanding system bus operation, in order that the proper interfaces can initiate the required data transfers to complete the operation. According to one known method, optimum performance is achieved by providing each of a node's interfaces with a dedicated queue of data movement commands containing the commands relevant to the interface. Each interface is termed a "consumer" of the commands provided by its corresponding queue. Each queue's consumer executes the queue commands as fast as possible, stalling only when a data resource is unavailable (i.e. another interface or the system bus is not ready to supply data, or a required data buffer is already in use).

To achieve this, it is known to provide multiple independent queues, one per consumer, with data resource interlock flags. The queue entries consist of data movement commands derived from the address and command portions of outstanding system bus transactions. These data movement commands include copies of all the address and command information required by a consumer to initiate a data transfer. The consumers read these data movement commands from their queues and move data as required in response to the commands. The consumers perform data transfers in parallel to the degree possible as indicated by the interlock flags. However, since such a multi-queue implementation typically requires substantial duplication of information (address, command, etc.) within each queue, it is typically very large; prohibitively so when implemented in design-area sensitive technology.

Alternatively, a single queue feeding multiple consumers can be employed. The single queue implementation requires no duplication of data, making its implementation advantageous in terms of implementation resources—i.e. fewer logic gates are required. Performance, however, is compromised because commands must be executed in the strict order in which they are queued, thus eliminating parallel execution of independent commands.

SUMMARY OF THE INVENTION

In accordance with the present invention, there is provided a command queuing structure for a multi-CPU node which combines the design-area advantage of a single queue implementation with the performance advantage of a multiple queue implementation to provide an optimum overall solution for the command queuing structure in a design-area sensitive implementation.

According to the general principles of the invention, there is provided a command queuing apparatus for controlling data transfers between consumers on a node adapted for coupling to a system bus in a computer system. The apparatus includes a core queue containing core queue entries. Each core queue entry corresponds to a pending system bus operation. Each core queue entry is made up of fields including one or more consumer information fields for each consumer. The apparatus further includes a virtual queue corresponding to each consumer. Each virtual queue has a virtual queue entry. A virtual queue entry for a consumer comprises a subset of the fields of a core queue entry. This subset includes the consumer information fields for the consumer corresponding to the virtual queue.

The fields of a core queue entry more particularly include an address field and a command field in addition to the consumer information fields associated with the various consumers. The subset of fields of a core queue entry comprising a virtual queue entry includes the address field, the command field, and the consumer information fields specific to the consumer corresponding to the virtual queue.

In a more specific sense, a virtual queue includes means for storing pointers to core queue entries, one of the pointers being a current pointer. Also included as part of the virtual queue is means for selecting a virtual queue entry, the virtual queue entry being a subset of fields of the core queue entry pointed to by the current pointer. The subset of fields includes the consumer specific fields specific to the consumer to which the virtual queue corresponds.

According to one embodiment, the means for storing pointers is a FIFO and the current pointer is the lead entry in the FIFO. The means for selecting a subset of fields is a multiplexer. Each of the multiple data inputs to the multiplexer comprises a subset of fields of a core queue entry, the subset of fields including the consumer specific fields specific to the consumer to which the virtual queue corresponds. The select inputs to the multiplexer are coupled to the current pointer so that the multiplexer produces as output a virtual queue entry comprising the subset of fields of the core queue entry pointed to by the current pointer.

The consumers according to this embodiment include a plurality of CPU interfaces, a CSR interface, and a system bus interface. Each CPU interface is coupled to the system bus interface, as is the CSR interface. The system bus interface is adapted for coupling to the system bus. Each consumer is coupled to the virtual queue associated with it for processing the virtual queue entries and controlling the transfer of data in response to the virtual queue entries. The CPU interfaces process their respective virtual queue entries to control the transfer of data between the CPU interfaces and the system bus interface. Likewise, the CSR interface processes its virtual queue entries to control the transfer of data between the CSR interface and the system bus interface, while the means associated with the system bus interface processes its virtual queue entries to control the transfer of data between the system bus interface and the system bus.

With this arrangement there is provided an apparatus having a single queue for storing address, command, and consumer specific information, and apparatus for generating virtual queue entries targeting the specific consumers, thereby providing the design-area advantage of a single queue implementation and the performance advantage of a multiple queuing structure.

DETAILED DESCRIPTION OF THE PREFERRED EMBODIMENT

Figure 1:
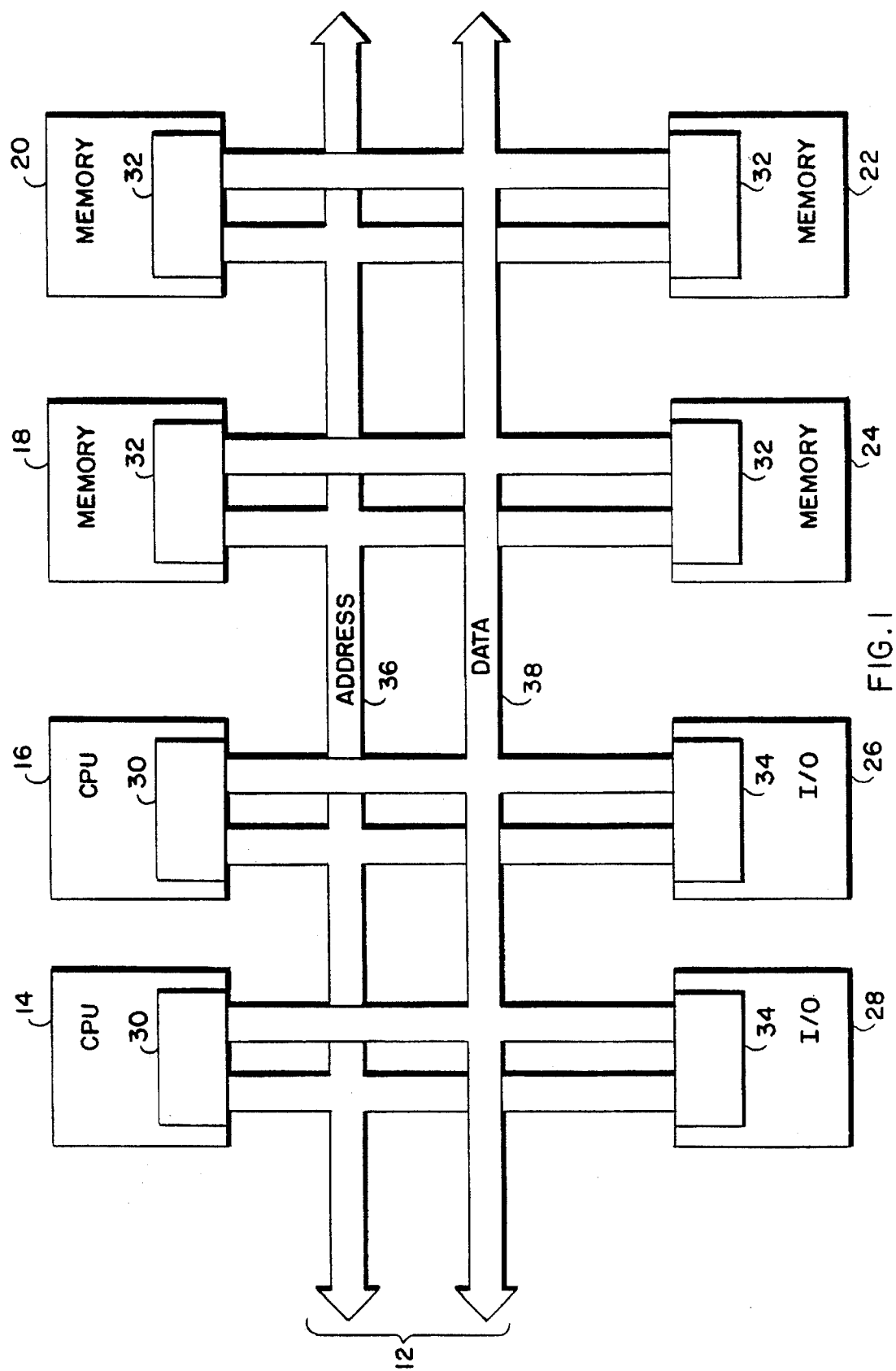
FIG. 1 is a block diagram of a multi-node computer system including multi-CPU nodes coupled to a pipelined system bus.

Referring now to FIG. 1, there is shown an example of a computer system 10 embodying the present invention. The computer system 10 includes a system bus 12 which is a pipelined, non-pended, synchronous bus facilitating communication between several nodes including CPU modules, memory nodes, and I/O nodes. Shown coupled to the system bus 12 are two CPU modules 14 and 16, four memory nodes 18, 20, 22, and 24, and two I/O nodes 26 and 28. The CPU modules 14 and 16 are coupled to the system bus 12 via a system bus interface 30. Likewise, the memory nodes 18, 20, 22, and 24 are coupled to the system bus 12 via a memory system bus interface 32, and I/O nodes 26 and 28 are each coupled to the system bus 12 via an I/O system bus interface 34.

According to the present embodiment the system bus 12 includes an address bus 36 and a data bus 38 separate from the address bus 36. Data transactions occur on the data bus 38 separately and independently of the occurrence of address and command transactions on the address bus 36; that is, the timing of data transactions and the rate at which data transactions are submitted to the data bus 38 is independent of the timing of address and command transactions and the rate at which address and command transactions are submitted to the address bus 36. A "system bus operation" (or "operation") is defined as a complete logical task being performed on the system bus 12. According to the principles of the invention, each system bus operation includes an address and command transaction occurring on the address bus 36, usually followed at some later time by a data transaction on the data bus 38. The operation of the system bus 12 is completely described in co-pending application Ser. No. 08/269,222, hereby expressly incorporated by reference.

Figure 2:
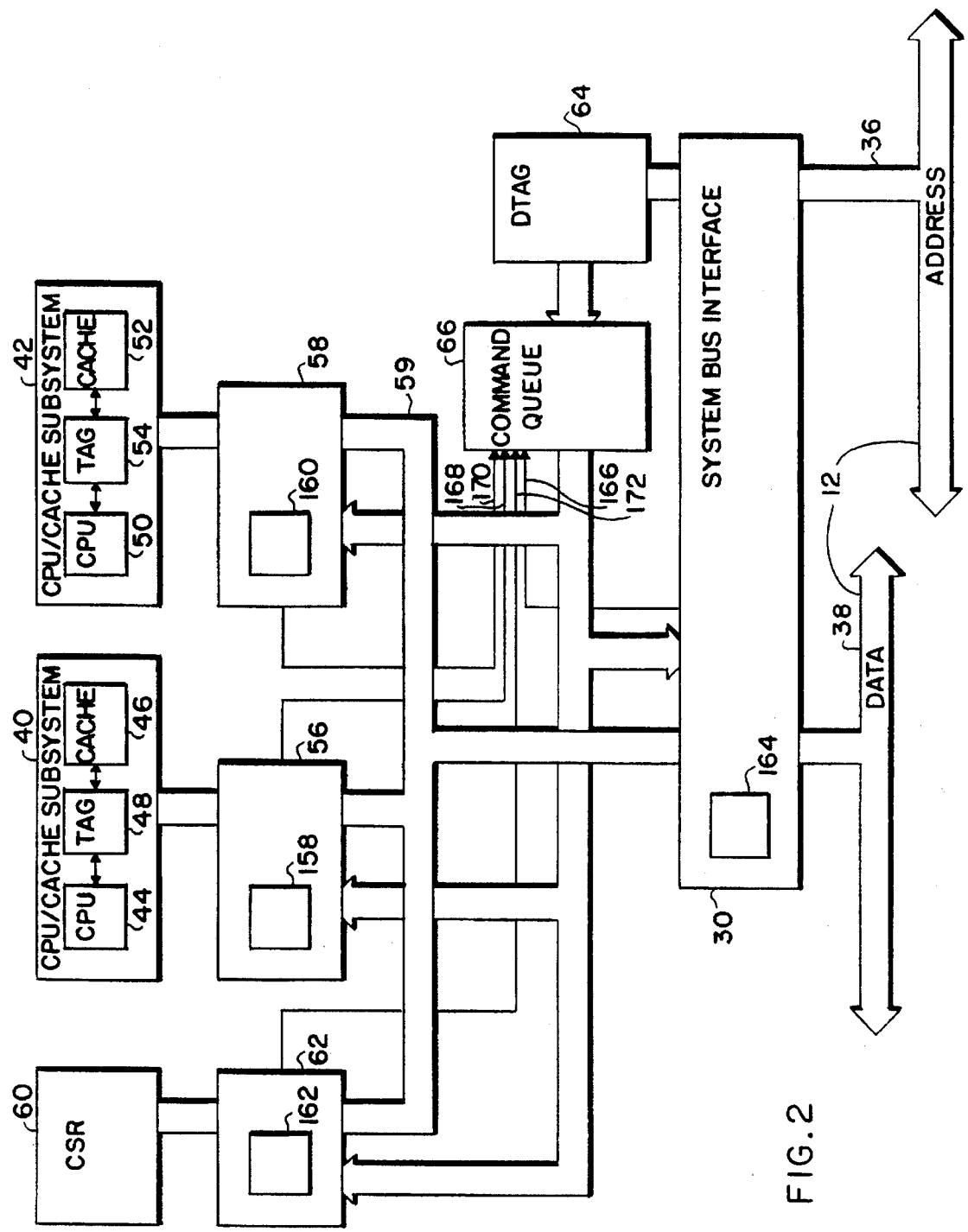
FIG. 2 is a block diagram of one of the multi-CPU nodes of FIG. 1 showing a command queue.

In FIG. 2 there is shown a block diagram of the CPU module 14 of FIG. 1. The CPU node 14 is a dual-processor module having two CPU/cache subsystems 40 and 42. The CPU/cache subsystem 40 includes a CPU 44, a cache 46, and a tag store 48. Likewise, the CPU/cache subsystem 42 includes a CPU 50, a cache 52, and a tag store 54. The CPU/cache subsystems 40 and 42 are coupled to CPU interfaces 56 and 58 respectively. Data transfers occur on an internal data bus 59 between the CPU/cache subsystems 40 and 42 and the system bus interface 30 via the CPU interfaces 56 and 58 respectively in response to address and command transactions occurring on the address bus 36.

The CPU node also includes a CSR block 60 which contains status registers accessed via I/O commands. The CSR block 60 is coupled to a CSR interface 62, which is in turn coupled to the system bus interface 30. Data transfers occur on the internal data bus 59 between the CSR block 60 and the system bus interface 30 via the CSR interface 62 in response to address and command transactions occurring on the address bus 36.

The CPU node further includes a duplicate tag controller or DTAG controller 64, which is coupled to the address bus 36 via the system bus interface 30. The DTAG controller 64 feeds a command queue 66. The command queue 66 is in turn coupled to the system bus interface 30, the CPU interfaces 56 and 58, and the CSR interface 62. The DTAG controller 64 uses address and command information received from the address bus 36 to access the cache status within each of the duplicate tag stores 48 and 54. This cache status is combined with the address and command information received from the address bus 36 to provide information to the command queue 66, the contents of which is used by the system bus interface 30, the CPU interfaces 56 and 58, and the CSR interface 62 to direct data transfers at the appropriate times.

It should be understood that FIG. 2 depicts a logical representation only, and is capable of a variety different physical embodiments. For example, the internal data bus 59, shown for simplicity as a single bus, may actually be implemented as several distinct busses in separate VLSI chips including sections of the CPU interfaces 56 and 58, the CSR interface 62, and the system bus interface 30.

Since the system bus 12 is a pipelined bus having a separate address bus 36 and data bus 38 which operate independently, multiple system bus operations can be outstanding at once. In addition, a single system bus operation can involve data transfers between any of the CPU/cache subsystems 40 and 42 and the system bus interface 30, between the CSR block 60 and the system bus interface 30, and between the system bus interface 30 and system bus 12.

The command queue 66 directs address and command information to the system bus interface 30, the CPU interfaces 56 and 58, and the CSR interface 62. The address and command information is used by the system bus interface 30 to control the transfer of data between the system data bus 38 and system bus interface 30, and by the CPU interfaces 56 and 58 respectively to control the transfer of data between the system bus interface 30 and the CPU/cache subsystems 40 and 42. Also, the CSR interface 62 uses the address and command information to control data transfers between the system bus interface 30 and the CSR block 60. Since the CPU interfaces 56 and 58, the CSR interface 62, and the system bus interface 30 all "consume" address and command information provided by the command queue, these interfaces are referred to collectively as "consumers".

Figure 3:
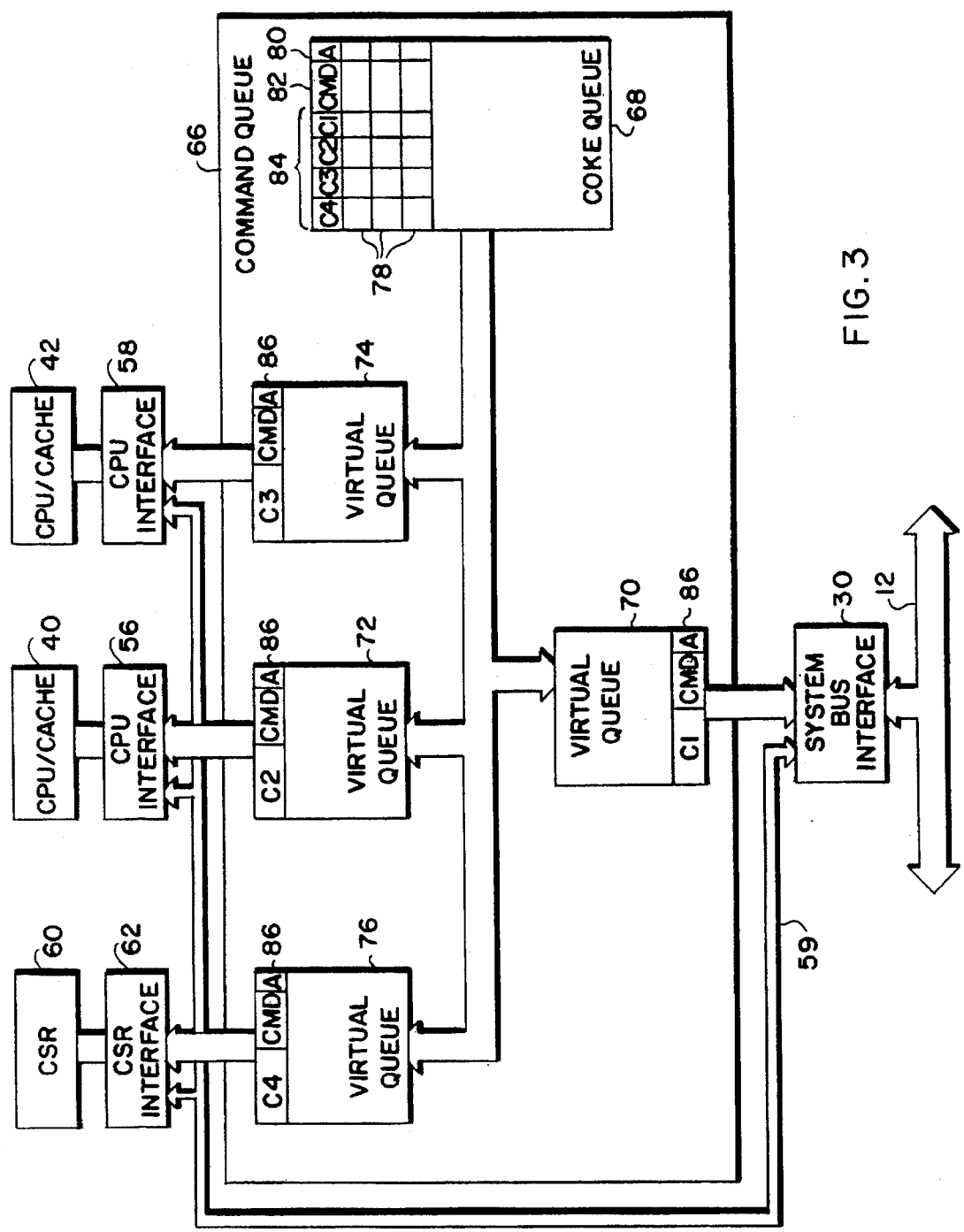
FIG. 3 is a block diagram of the command queue of FIG. 2 according to the principles of the invention.

Referring now to FIG. 3, the command queue 66 is shown in further detail. According to the principles of the invention, the command queue 66 includes a core queue 68 and virtual queues 70, 72, 74, and 76. According to the principles of the invention, the core queue 68 is a circular queue having a core queue entry 78 for each outstanding system bus operation. In the preferred embodiment, up to eight core queue entries 78 can reside in the core queue 68 at once. Each core queue entry 78 includes, among other things, an address field 80, a command field 82, and consumer information fields 84 specific to each consumer involved in the transaction.

Each virtual queue is associated with a particular consumer. In particular, the virtual queue 70 is associated with the system bus interface 30, the virtual queue 72 is associated with the CPU interface 56, the virtual queue 74 is associated with the CPU interface 58, and the virtual queue 76 is associated with the CSR interface 62. Each virtual queue 70, 72, 74, and 76 produces a virtual queue entry 86. According to the principles of the invention, each virtual queue entry 86 is made up of a subset of the fields in a core queue entry 78. This subset of fields includes the address field 80, the command field 82, and the consumer information fields 84 for the consumer corresponding to the virtual queue. Each consumer 30, 56, 58, and 62 "consumes" the virtual queue entries 86 from its respective virtual queue 70, 72, 74, and 76, and controls the transfer of data on the internal data bus 59 in response to the contents of its virtual queue entry 86. Specifically, the CPU interfaces 56 and 58 transfer data between the system bus interface and the CPU/cache subsystems 40 and 42 in response to the virtual queue entries 86 from virtual queues 72 and 74 respectively. The CSR interface 62 transfers data between the CSR block 60 and the system bus interface 30 in response to the virtual queue entry 86 from the virtual queue 76. The system bus interface 30 controls the transfer of data between the system bus 12 and the system bus interface 30 in response to the virtual queue entry 86 from virtual queue 70.

According to the principles of the invention, the virtual queues 70, 72, 74, and 76 have the advantageous properties of separate circular queues, but are not actually implemented as queues containing copies of information in the core queue 68. The advantages of a separate queuing structure are thereby obtained without incurring the design area expense of separate queues.

Figure 4:
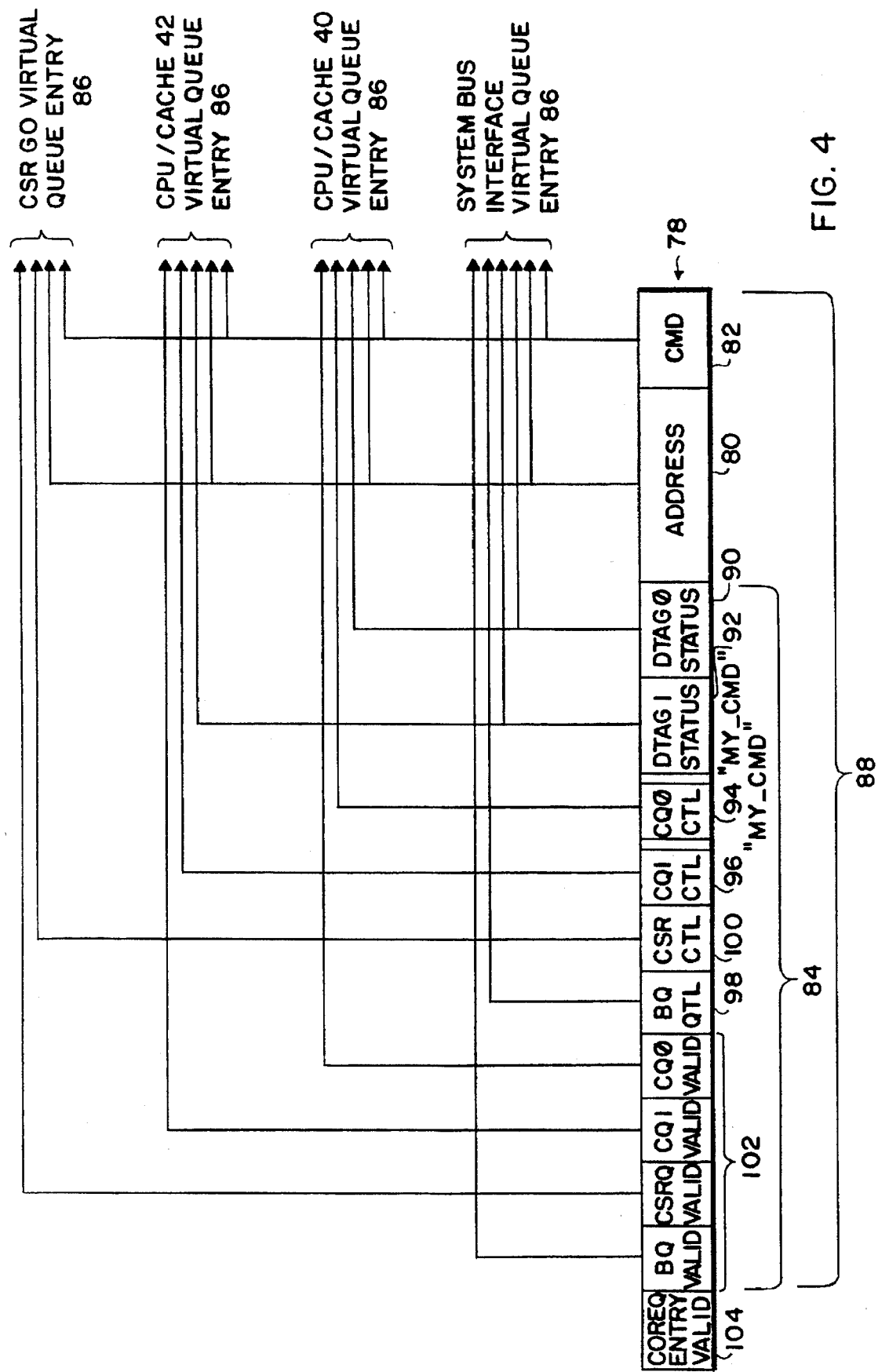
FIG. 4 is a block diagram of a core queue entry showing the subsets of a core queue entry included in each virtual queue.

Referring now to FIG. 4, there is shown a single core queue entry 78 corresponding to an outstanding system bus operation. The core queue entry 78 includes a number of fields 88. A subset of these fields makes up each virtual queue entry 86. In particular, the core queue entry 78 includes an ADDRRESS field 80 and a CMD command field 82. These fields indicate the address and type of command for a currently outstanding system bus operation, as received from the address bus 36. The remaining fields are the consumer information fields 84 specific to the individual consumers. The consumer information fields 84 include a DTAG0 status field 90 and a DTAG1 status field 92. These status fields indicate the cache status of an outstanding system bus operation relative to the caches 46 and 52 respectively. Further consumer information fields are the CQ0_CTL field 94, the CQ1_CTL field 96, the BQ_CTL field 98, and the CSR_CTL field 100, which are control fields used by the CPU interfaces 56 and 58, the system bus interface 30, and the CSR interface 62 respectively. These control fields are flexible in their implementation, and can be used to indicate a variety of conditions to their respective interfaces. Also included as consumer information fields 84 are valid bits 102 CQ0_VALID, CQ1_VALID, CSRQ_VALID, and BQ_VALID, corresponding to the CPU/cache subsystems 40 and 42, the CSR block 60, and the system bus 12 consumers respectively. The valid bits 102, when set, indicate that the corresponding consumer is involved in the bus operation associated with the core queue entry 78. These bits are reset by the consumer interface associated with the bit upon completion of that consumer's portion of the data transfer associated with the core queue entry 78. Finally, a core queue entry valid bit 104 indicates that the core queue entry is valid. It is set whenever any of the four valid bits 102 are set; i.e. it is a logical 'OR' of the four valid bits 102.

A virtual queue entry 86 for a given consumer is made up of a subset of the fields 88 of a core queue entry 78: specifically, of the fields 88 which are associated with that consumer. For instance, a virtual queue entry 86 for the virtual queue 72 corresponding to the CPU interface 56 is made up of the ADDRESS field 80, the CMD command field 82, the DTAG0 status field 90, the CQ0_CTL field 94, and the CQ0_VALID bit 102. Likewise, a virtual queue entry 86 for the virtual queue 74 corresponding to the CPU interface 58 is made up of the ADDRESS field 80, the CMD command field 82, the DTAG1 status field 92, the CQ1_CTL field 96, and the CQ1_VALID bit 102. A virtual queue entry 86 for the virtual queue 76 corresponding to the CSR interface 62 is made up of the ADDRESS field 80, the CMD command field 82, the CSR_CTL field 100, and the CSRQ_VALID bit 102. Finally, a virtual queue entry 86 for the virtual queue 70 corresponding to the system bus interface 30 is made up of the ADDRESS field 80, the CMD command field 82, the DTAG0 status field 90, the DTAG1 status field 92, the BQ_CTL field 98, and the valid bit 102 BQ_VALID bit 102.

Figure 5:
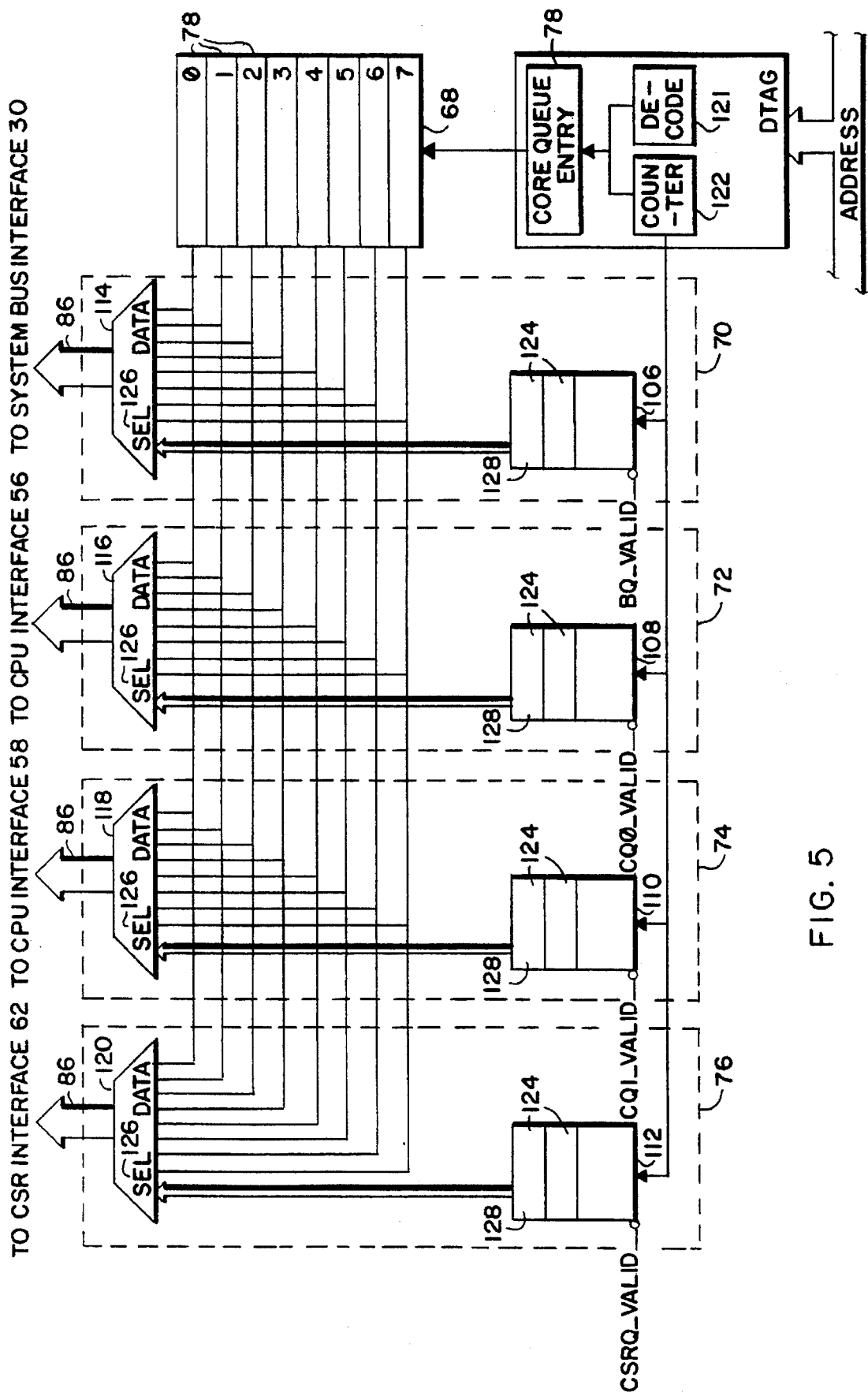
FIG. 5 is a block diagram showing the implementation of the core queue and virtual queues according to the principles of the invention.

Referring now to FIG. 5, there is shown the implementation of the command queue 66 on the CPU node 14 according to the preferred embodiment. The command queue 66 is shown to include the core queue 68 and the four virtual queues 70, 72, 74, and 76. The core queue 68 is fed by the DTAG controller 64. Each virtual queue 70, 72, 74, and 76 is shown to include a FIFO 106, 108, 110, and 112, and a multiplexer 114, 116, 118, and 120 respectively.

In operation, address and command information associated with a particular system bus operation is fed from the address bus 36 to the DTAG controller 64, which accesses duplicate tag status and decodes the address and command information via decoder 121 to determine which of the consumers on the CPU node 14 are involved in the bus operation. The DTAG controller 64 builds a core queue entry 78 in response to this decode, the contents of each of the fields 88 of the core queue entry 78 being dependent upon the decode. This core queue entry 78 is then loaded into the core queue 68. The core queue 68 is implemented as an eight-deep FIFO; thus, each new core queue entry 78 is loaded in a location directly behind any previous core queue entries 78. A counter 122 within the DTAG controller 64 is used to load successive locations in the core queue 68 and keeps track of the number of outstanding core queue entries 78.

Each of the eight core queue entries 78 are coupled to the virtual queue multiplexers 114, 116, 118, and 120. The virtual queue multiplexers provide the means for selecting virtual queue entries 86 from subsets of the core queue entries 78. Thus, only the portions of each core queue entry 78 associated with a particular virtual queue, as shown in FIG. 4, are fed as input to that virtual queue's virtual queue multiplexer. For instance, virtual queue 70 is associated with the system bus interface 30 consumer. Therefore, the ADDRESS field, the CMD field, the DTAG0 status field, the DTAG1 status field, and the BQ_CTL field for each of the eight core queue entries 78 are input to the virtual queue multiplexer 114. Likewise, the virtual queue 72 is associated with the CPU interface 56 consumer. Therefore, the ADDRESS field, the CMD field, the DTAG0 status field, and the CQ0_CTL field for each core queue entry 78 are input to the virtual queue multiplexer 116. For the virtual queue 76 associated with the CSR interface 62 consumer, the ADDRESS field, the CMD field, and the CSR_CTL field for each core queue entry 78 are input to the virtual queue multiplexer 120. The virtual queue FIFOs 106, 108, 110, and 112 provide a means for storing pointers to core queue entries. According to the FIFO implementation, the FIFOs 106, 108, 110, and 112 contain FIFO entries 124. The lead FIFO entry 124 in a FIFO serves as a current pointer 128 to a core queue entry. The select inputs 126 for the virtual queue multiplexers 114, 116, 118, and 120 are fed by the current pointer 128 from each virtual queue FIFO 106, 108, 110, and 112 respectively.

The contents of the FIFO entries 124 are, in turn, controlled by the counter 122 and the valid bits 102 within the core queue entries 78. When the DTAG controller 64 decodes cache status from the duplicate tags 48 and 54 and address and command information from the address bus 36 to determine which consumers on the CPU node 14 are involved in the bus operation with which the address and command information is associated to build a core queue entry 78 as shown in FIG. 5, it sets the appropriate valid bits 102 within the core queue entry 78. The valid bits 102 and the output of the counter 122 are fed to the virtual queue FIFOs 106, 108, 110, and 112. If a VALID bit 102 corresponding to a particular consumer is set, the value output by the counter 122 is loaded as a FIFO entry 124 into the virtual queue FIFO associated with that consumer. In other words, the VALID bit 102 enables loading of the counter output into the virtual queue FIFO. That FIFO entry 124, when it is the lead FIFO entry and thus the current pointer 128, drives the select inputs 126 on the virtual queue multiplexer associated with the consumer, thereby "selecting" the subset of fields 88 of the core queue entry 78 pointed to by the current pointer.

Note that, in the production of the virtual queue entries 86 for a given consumer, only pointers representing locations in the core queue 68 of the core queue entries 78 relevant to the consumer are actually queued. These stored pointers then act to select portions of the relevant core queue entries 78 through the virtual queue multiplexers to forward them to the consumer interfaces. Needless duplication of substantial amounts of address and command information is thereby avoided, while the advantages of actual separate queues are maintained.

For example, assume all virtual queue FIFOs and the core queue 68 are empty. The core queue 68 is implemented as an eight deep circular queue wherein core queue entries 78 are circularly loaded into locations 0–7. The DTAG controller 64 decodes address and command information received from the address bus 36, and determines that a data transfer involving only the system bus interface 30 consumer is required. The virtual queue FIFO 106 which is part of the virtual queue 70 associated with the system bus interface 30 consumer is fed by the counter 122 and the BQ_VALID bit from the core queue entry 78 being built by the DTAG controller 64. The BQ_VALID bit is set in the core queue entry 78 by the DTAG controller 64, indicating that the core queue entry 78 being built is associated with a system bus operation that involves the system bus 12. The value indicated by the counter 122—in this case, 0—is loaded into the first location in the virtual queue FIFO 106, thereby becoming the current pointer 128 for the virtual queue 70. Meanwhile the core queue entry 78 built by the DTAG controller 64 is loaded as core queue entry '0' into the first location, location '0', in the core queue 68. Since the current pointer 128 of the virtual queue FIFO 106 feeds the select inputs 126 on the virtual queue multiplexer 114, the output of the virtual queue multiplexer 114 forwards the portion of core queue entry '0' associated with the system bus 12 consumer to the system bus interface 30.

Assume that the next system bus operation decoded by the DTAG controller 64 involves the system bus 12 consumer and the CPU interface 56 consumer, and is initiated before the system bus operation associated with the core queue entry '0' has completed. The value output by the counter 122 is now '1', and the BQ_VALID and CQ0_VALID bits are set in the core queue entry 78 built by the DTAG controller 64 in response to decoding the address and command information associated with the system bus operation. In response to the setting of the CQ0_VALID bit, the output of the counter 122 is written into the first entry of the virtual queue FIFO 108 associated with the CPU interface 56 consumer, thereby becoming the current pointer 128 for the virtual queue FIFO 108. Also, in response to the setting of the BQ_VALID bit, the output of the counter 122 is written into the second entry of the virtual queue FIFO 106 associated with the system bus interface 30 consumer. Thus, the virtual queue FIFO 106 now contains two FIFO entries 124, the current pointer 128 '0' followed by a FIFO entry 124 of '1', while the virtual queue FIFO 108 contains just the current pointer 128 of '1'. The current pointer 128 of each virtual queue FIFO 106 and 108 feeds the corresponding virtual queue multiplexer 114 and 116; thus, the relevant subset of core queue entry '0' is selected by the virtual queue multiplexer 114 associated with the system bus interface 30 and the system bus 12, while a subset of the core queue entry '1' is selected by the virtual queue multiplexer 116 associated with the CPU interface 56 and the CPU/cache subsystem 40.

Note now that, while the virtual queue 70 forwards to the system bus interface 30 a subset of the core queue entry '0' associated with the first system bus operation, the virtual queue 72 simultaneously forwards to the CPU interface 56 a subset of the core queue entry '1' associated with the second system bus operation. Thus it is possible that, where successive system bus operations target different consumers on the CPU node 14 in a data—independent manner, these system bus operations can be performed in parallel, thereby providing the advantages of a multiple queuing structure.

In general, virtual queue entries 86 remain valid until the data transaction indicated by the address, command, and consumer information associated with the virtual queue entry 86 has been completed. For example, when the data has been transferred between the system bus interface 30 and the system bus 12 for the core queue entry '0' described above, the BQ_VALID bit within the core queue entry '0' is reset. The top entry in the virtual queue FIFO 70 is retired in response, and the next virtual queue entry 86 in virtual queue FIFO 70 (if valid) will select a different core queue entry through the virtual queue multiplexer 114. A core queue entry 78 remains valid until all of the 'BQ', 'CQ0', 'CQ1', and 'CSRQ' bits within the core queue entry 78 have been reset. In other words, the four 'valid' bits are logically "OR'ed" together to provide a "core entry valid" indicator. When the "core entry valid" indicator is deasserted, the core entry is retired, and may be replaced with a new core queue entry 78.

Where successive system bus operations target different consumers on the CPU node 14 in a data—dependent manner, or where a single bus operation targets multiple consumers in a data—dependent manner, there must be provided some means for indicating to each consumer interface when a data transfer may occur in response to a virtual queue entry 86, and for how long a virtual queue entry 86 and its corresponding core queue entry 78 must remain valid. The interlock block 130 (FIG. 6) is provided for this purpose.

Figure 6:
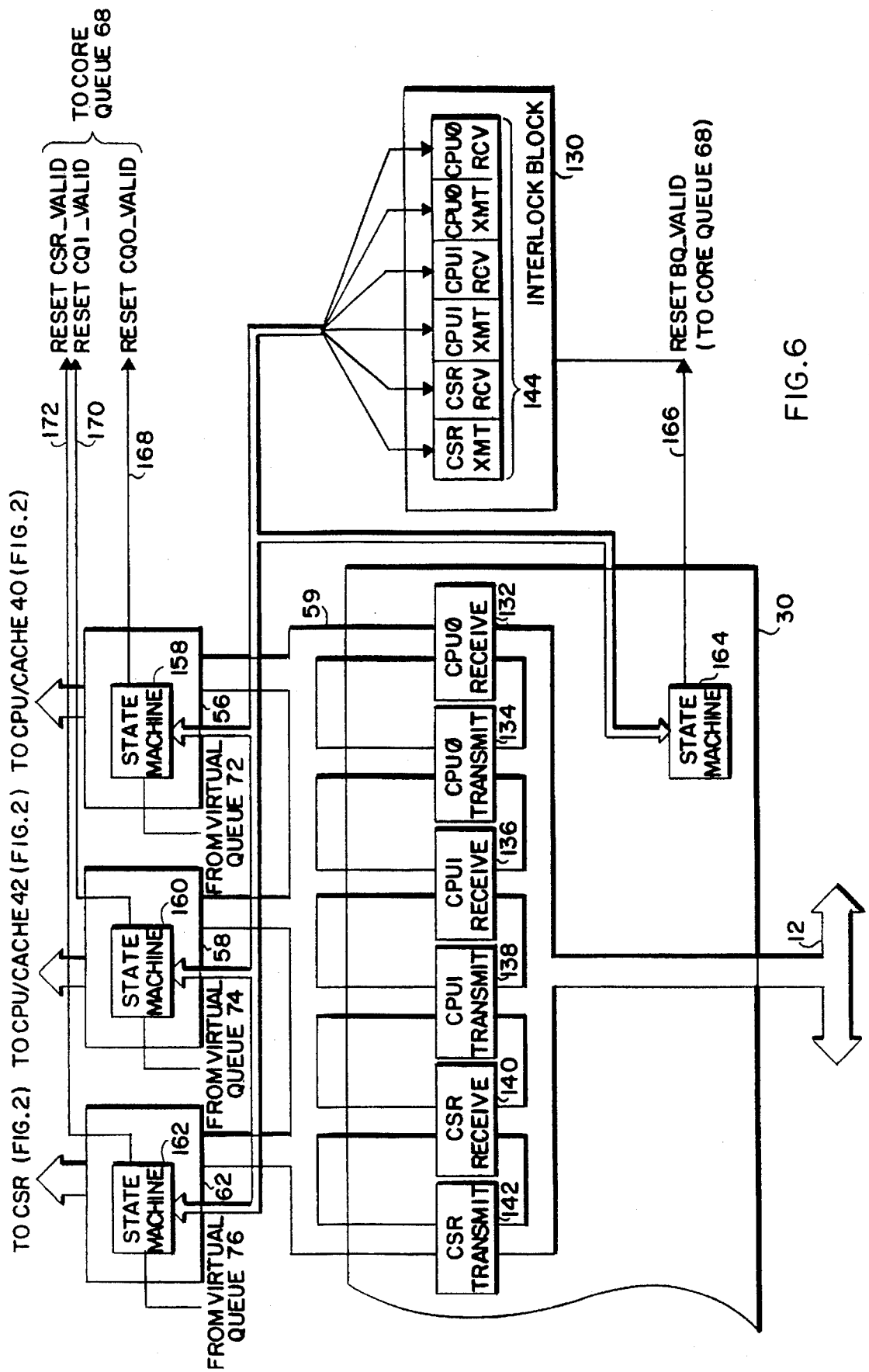
FIG. 6 is a block diagram of data buffers and the interlock block.

Referring now to FIG. 6, the system bus interface 30 includes a receive buffer and a transmit buffer for each consumer located on the CPU node 14. That is, there exists a CPU0 receive buffer 132 and a CPU0 transmit buffer 134 associated with the CPU interface 56, a CPU1 receive buffer 136 and a CPU1 transmit buffer 138 associated with the CPU interface 58, and a CSR receive buffer 140 and a CSR transmit buffer 142 associated with the CSR interface 62. (In one particular variation of the preferred embodiment, only a single CSR buffer is provided, and CSR accesses are serialized such that CSR reads and writes cannot occur at the same time. The CSR interface 62 will, however, be herein discussed as having both a CSR receive buffer 140 and a CSR transmit buffer 142 for clarity and consistency of description.)

The interlock block 130 includes a plurality of resource flags 144, one resource flag 144 per buffer within the system bus interface. The flags 144 indicate to the various consumer interfaces the time at which a data transfer can be initiated. In particular, the CPU0 RCV Flag 146 indicates when set that the CPU0 receive buffer 132 is full, and indicates when reset that the CPU0 receive buffer 132 is empty. The CPU0 XMT Flag 148 indicates when set that the CPU0 transmit buffer 134 is full, and indicates when reset that the CPU0 transmit buffer 134 is empty. The CPU1 RCV Flag 150 and CPU1 XMT Flag 152 work the same way for the CPU1 receive buffer 136 and CPU1 transmit buffer 138. Likewise, the CSR RCV Flag 154 and CSR XMT Flag 156 indicate when set that the respective CSR receive buffer 140 or CSR transmit buffer 142 is full, and indicate when reset that the respective CSR receive buffer 140 or CSR transmit buffer 142 is empty.

The CPU interfaces 56 and 58, the CSR interface 62, and the system bus interface 30 each include a state machine 158, 160, 162, and 164 respectively. Each state machine accepts virtual queue entries 86 from the virtual queue for its consumer and, in response to the consumer information contained within a virtual queue entry 86, determines which data buffers will be employed to complete the data transfer associated with the virtual queue entry 86. Each state machine 158, 160, 162, and 164 monitors the appropriate flags 144 within the interlock block 30 to determine when to transfer data, sets and resets the flags 144 accordingly, and resets the valid bits 102 within a core queue entry 78 upon retirement of a virtual queue entry. The state machines 158, 160, 162, and 164 thus provide the means for "consuming" the virtual queue entries corresponding to the respective interfaces in which the state machines are located.

For example, in order to complete a "read" operation initiated by the CPU/cache subsystem 40, a data transfer must occur to move data from the system bus 12 into the CPU0 receive buffer 132, and a second data transfer must then move the data from the CPU0 receive buffer 132 to the CPU/cache subsystem 40. A core queue entry 78 for such a "read" operation is built in which the valid bits 102 BQ_VALID and CQ0_VALID are set, resulting in virtual queue entries 86 in virtual queues 70 and 72 respectively. The first data transfer that moves data from the system bus 12 into the CPU0 receive buffer 132 is controlled by the virtual queue entry 86 in virtual queue 70 associated with the system bus interface 30. The second data transfer that moves the data from the CPU0 receive buffer 132 to the CPU/cache subsystem 40 is controlled by the virtual queue entry 86 in virtual queue 72 associated with the CPU interface 56. The second data transfer, however, cannot be initiated until the first data transfer is completed. And, while the virtual queue entry 86 in virtual queue 70 need remain valid only through the first data transfer, the virtual queue entry 86 in 72 must (according to this implementation) remain valid during both the first and second data transfers. Furthermore, the core queue entry 78 must remain valid until the data transfers associated with all related virtual queue entries 86 have been completed, in order that the subset of the core queue entry 78 associated with an uncompleted virtual queue entry 86 remain valid at the corresponding virtual queue multiplexer.

Therefore, in response to the address and command and consumer information contained within the virtual queue entry 86 for virtual queue 70, the state machine 164 within the system bus interface 30 controls the movement of data from the system bus 12 into the CPU0 receive buffer 132. When the requested data is returned via the data bus 38, the state machine 164 controls the latching of the data on the data bus 38 into the CPU0 receive buffer 132. The state machine 164 then sets the CPU0 RCV Flag 146 in the interlock block 130 to indicate that the CPU0 receive buffer 132 is full. The state machine 164 then resets the BQ_VALID bit in the core queue entry 78 via assertion of the RESET BQ_VALID signal on line 166 (FIGS. 2 and 6). The virtual queue FIFO 106 within the virtual queue 70 now selects the next valid virtual queue 70 entry for the system bus 12 through the virtual queue multiplexer 114. The core queue entry associated with the "read" operation, however, is still valid because the CQ0_VALID bit is still set.

Meanwhile, the state machine 158 within the CPU interface 56, in response to the address and command and consumer information contained within the virtual queue entry 86 for virtual queue 72, monitors the CPU0 RCV Flag 146 in the interlock block 130. When the state machine 158 determines that the CPU0 RCV Flag 146 is set, it controls the movement of data from the CPU0 receive buffer 132 to the CPU/cache subsystem 40. The state machine 158 then resets the CQ0_VALID bit in the core queue entry 78 via assertion of the RESET CQ0_VALID signal on line 168. Since all the valid bits 102 within the core queue entry 78 are reset, both the virtual queue 72 entry and the core queue entry 78 are now retired.

Referring generally to FIGS. 2–7, the full operation of the command queue 66 for various types of system bus operations is now set forth by example. First of all, the interoperation of the various structures making up the command queue 66 is well demonstrated by a "read dirty" system bus operation.

According to the preferred embodiment, cache coherency between the different CPU nodes 14 and 16 and between the different caches 46 and 52 on the same CPU node 14 is maintained by use of a caching protocol known in the art. According to this protocol, a "read dirty" operation is initiated on the system bus 12 when one CPU requests data that is "dirty" in another CPU's cache. Data is "dirty" in another CPU's cache if the CPU has updated the data since it was initially stored in the cache. During the "read dirty" operation the CPU associated with the cache containing the most up to date copy of the data returns that data to the requesting CPU. The "read dirty" operation thus ensures that the requesting CPU obtains the latest updated copy of the requested data. The "read dirty" operation conveniently demonstrates the interaction of the core queue 68, the virtual queues 70, 72, 74, and 76, and the interlock block 130.

Assume, for example, that the CPU/cache subsystem 40 on the CPU node 14 initiates a "read dirty" operation for data which is stored in the other CPU/cache subsystem 42 on the CPU node 14. This operation requires a data transfer from the CPU/cache subsystem 42 to the system bus interface 30, followed by a transfer from the system bus interface 30 to the system bus 12, followed by a transfer from the system bus 12 back to the system bus interface 30, followed by a transfer from the system bus interface 30 to the CPU/cache subsystem 40. Assume also that the core queue 68 and the virtual queue FIFOs 106, 108, 110, and 112 are empty.

The "read dirty" operation is initiated by the CPU interface 56 by submitting an address bus transaction to the address bus 36 via the system bus interface 30. The DTAG controller 64 decodes the transaction on the address bus 36 and determines that the transaction is a "read dirty", and that the system bus interface 30 consumer, the CPU interface 56 consumer, and the CPU interface 58 consumer are involved in the operation. The DTAG controller 64 builds a core queue entry 78 in response to the decode. The ADDR address field 80 (see FIG. 4) of the core queue entry 78 contains the memory address from which the CPU/cache subsystem 40 requests data. The CMD command field 82 indicates that the operation is a read. The DTAG0 status field 90 indicates the cache status of the requested address within the CPU/cache subsystem 40. The DTAG1 status field 92 indicates the cache status of the requested address within the CPU/cache subsystem 42—i.e. "dirty". Within the CQ0_CTL field 94 is a "MY_CMD" bit (FIG. 4), indicating when set that the CPU/cache subsystem 40 initiated the present operation. Likewise, the CQ1_CTL field 96 includes a "MY_CMD" bit indicating when set that the CPU/cache subsystem 42 initiated the present operation. In this example, the operation was initiated by the CPU/cache subsystem 40; thus, the "MY_CMD" bit within the CQ0_CTL field 94 is set, while the "MY_CMD" bit within the CQ1_CTL field 96 is reset. The CQ1_CTL field 96 and DTAG1 status field 92 indicate to the CPU interface 56 that a read operation is occurring of data which is dirty in the CPU/cache subsystem 42, and thus the CPU/cache subsystem 42 should drive data, via the CPU interface 58 and the system bus interface 30, onto the system bus 12 in response. The BQ_CTL field 98 includes information indicating to the system bus interface 30, among other things, that the CPU0 receive buffer 132 and the CPU1 transmit buffer 138 will be utilized. The CQ0_VALID , CQ1_VALID , and BQ_VALID bits 102 are set.

Since the core queue 68 was empty prior to the building of this core queue entry 78, the counter outputs a value of '0', and the core queue entry 78 is loaded into location '0' in the core queue 68. Since the CQ0_VALID , CQ1_VALID , and BQ_VALID bits 102 are set, the virtual queue FIFO 106 corresponding to the system bus interface 30 consumer, the virtual queue FIFO 108 corresponding to the CPU interface 56 consumer, and the virtual queue FIFO 110 corresponding to the CPU interface 58 consumer are each loaded with the counter value '0'. The core queue entry 78 '0' is therefore selected through the virtual queue multiplexers 114, 116, and 118, producing virtual queue entries 86 for the system bus interface 30, CPU interface 56, and CPU interface 58 respectively.

Within the CPU interface 56, the CMD command field 82 contained within the virtual queue entry 86 from the virtual queue 72 indicates to the state machine 158 that a read type operation is occurring, and the "MY_CMD" bit within the CQ0_CTL field 94 indicates to the state machine 158 that the CPU/cache subsystem 40 initiated the read operation. The state machine 158 responds to this information by continually monitoring the CPU0 RCV Flag 146 within the interlock block 130.

Meanwhile, within the CPU interface 58, the CMD command field 82 contained within the virtual queue entry 86 from the virtual queue 72 indicates to the state machine 158 that a read type operation is occurring, and the "MY_CMD" bit within the CQ1_CTL field 96 indicates to the state machine 160 that some other CPU/cache subsystem; i.e. cache subsystem 40, initiated the read operation. The ADDRESS field 80 and the DTAG1 status field 92 indicate that the cache 52 within the CPU/cache subsystem 42 contains valid dirty data which must be returned in response to the read request. The state machine 160 responds to this information by transferring the dirty data from the CPU/cache subsystem 42 to the CPU1 transmit buffer 138 within the system bus interface 30, and then setting the CPU1 XMT Flag 152 within the interlock block 130. The state machine 160 then asserts a RESET_CQ1_VALID signal on line 170 to reset the CQ1_VALID bit within the core queue entry 78 '0', and the virtual queue entry 86 from the virtual queue 74 is retired. The current pointer 128 at the top of the virtual queue FIFO 110 is invalidated. A successive entry in the virtual queue FIFO 110 then becomes the current pointer 128 in the FIFO 110, selecting another core queue entry 78 through the multiplexer 118, thus presenting a new virtual queue entry 86 to the CPU interface 58.

Meanwhile, within the system bus interface 30 the CMD command field 82 contained within the virtual queue entry 86 from the virtual queue 70 indicates to the state machine 164 that a read type operation is occurring. The BQ_CTL field 98 indicates that the data transaction portion of the system bus operation is to be initiated by the CPU node 14. The DTAG1 status field 92 indicates that "dirty" data will be driven from the CPU interface 58 of the CPU node 14 onto the system data bus 38 during the data transaction. In response to this information, the state machine 164 monitors the CPU1 XMT Flag 152 within the interlock block. When the CPU1 XMT Flag 152 is set, indicating that data is present in the CPU1 transmit buffer 138, the state machine 164 controls the transfer of the data from the system bus interface 30 to the system data bus 38, and then controls the transfer of the data from the system data bus 38 into the CPU0 receive buffer 132. The state machine 164 then resets the CPU1 XMT Flag 152 and sets the CPU0 RCV Flag 146. The state machine 164 then resets the BQ_VALID bit (via assertion of the RESET_BQ_VALID bit on line 166) in the core queue entry 78 '0', retiring the virtual queue entry 86 from the virtual queue 70, and causing the next entry in the virtual queue FIFO 106 to advance to the top of the FIFO. A subset of a different core queue entry 78 is then selected through the virtual queue multiplexer 114 to the system bus interface 30.

Meanwhile, the virtual queue entry from the virtual queue 72 remains a subset of the core queue entry 78 '0'. The state machine 158 within the CPU interface 56 monitors the CPU0 RCV Flag 146 within the interlock block 130 until it is set by the system bus interface state machine 164. When the CPU0 RCV Flag 146 is set, the state machine 158 controls the transfer of the data from the CPU0 receive buffer 132 within the system bus interface 30 to the CPU/cache subsystem 40, and then resets the CPU0 RCV Flag 146. The state machine 158 then resets the CQ0_VALID bit within the core queue entry 78 '0' via assertion of the RESET_CQ0_VALID bit on line 168. Since all the valid bits 102 within the core queue entry 78 '0' are now reset, the core queue entry 78 '0' is retired, as is the virtual queue entry from the virtual queue 72.

Next, to demonstrate the parallel nature of virtual queue operations, consider a "CSR read" operation targeting some register in the CSR block 60, followed by a "read dirty" operation initiated by the CPU/cache subsystem 40 targeting data which is dirty in the cache 52 within the CPU/cache subsystem 42. The core queue 68 and virtual queue FIFO's 70, 72, 74, and 76 are initially empty, and thus the counter 122 output is '0'.

A "CSR read" operation targeting the CSR block 60 can be initiated by another node in the computer system such as CPU node 16, or by, for example, a CPU/cache subsystem on the same CPU node 14 as the CSR block 60. For purposes of this example, the CSR read operation is initiated by the CPU/cache subsystem 40, and thus requires that data be moved from the CSR block 60 to the system bus interface 30, then from the system bus interface 30 to the system data bus 38 and to the CPU/cache subsystem 40.

The DTAG controller 64 responds to the address bus transaction associated with this operation by building a core queue entry '0' The "read" operation involves the system bus interface 30, CSR interface 62, and CPU interface 56 consumers; thus, the BQ_VALID, CSR_VALID , and CQ0_VALID bits are set within the core queue entry '0'. The virtual queue FIFO 106 associated with the system bus interface 30, the virtual queue FIFO 112 associated with the CSR interface 62, and the virtual queue FIFO 108 associated with the CPU interface 56 are both loaded with the counter 122 output '0', which becomes the current pointer for each virtual queue. The virtual queue multiplexers 114, 120, and 116 therefore select the appropriate subsets of the core queue entry '0' to the system bus interface 30, the CSR interface 62, and the CPU interface 56 respectively.

Assuming the CSR XMT Flag 156 is reset, the state machine 162 within the CSR interface 62 attempts to transfer data from the CSR block 60 into the CSR transmit buffer 142 within the system bus interface 30 in response to the virtual queue 76 entry. This data transfer, however, can take a relatively long time. For example, the "CSR read" operation might target a DUART device register within the CSR block 60 which has a relatively long access time.

Meanwhile, the DTAG controller 64 decodes the next address bus transaction, determining that a "read dirty" of data from the CPU/cache subsystem 42 has been requested by the CPU/cache subsystem 40. A core queue entry '1' is built as previously explained, having the BQ_VALID, CQ0_VALID , and CQ1_VALID bits set. The counter 122 output value '1' is written into each of the virtual queue FIFOs 106, 108, and 110.

The "read dirty" operation initiated by the CPU/cache subsystem 40 requires a data transfer from the CPU/cache subsystem 42 to the CPU1 transmit buffer 138 in the system bus interface 30, followed by a data transfer from the CPU1 transmit buffer 138 in the system bus interface 30 to the system bus 12 and into the CPU0 receive buffer 132 within the system bus interface 30, followed by a data transfer from the system bus interface 30 to the CPU/cache subsystem 40.

Figure 7:
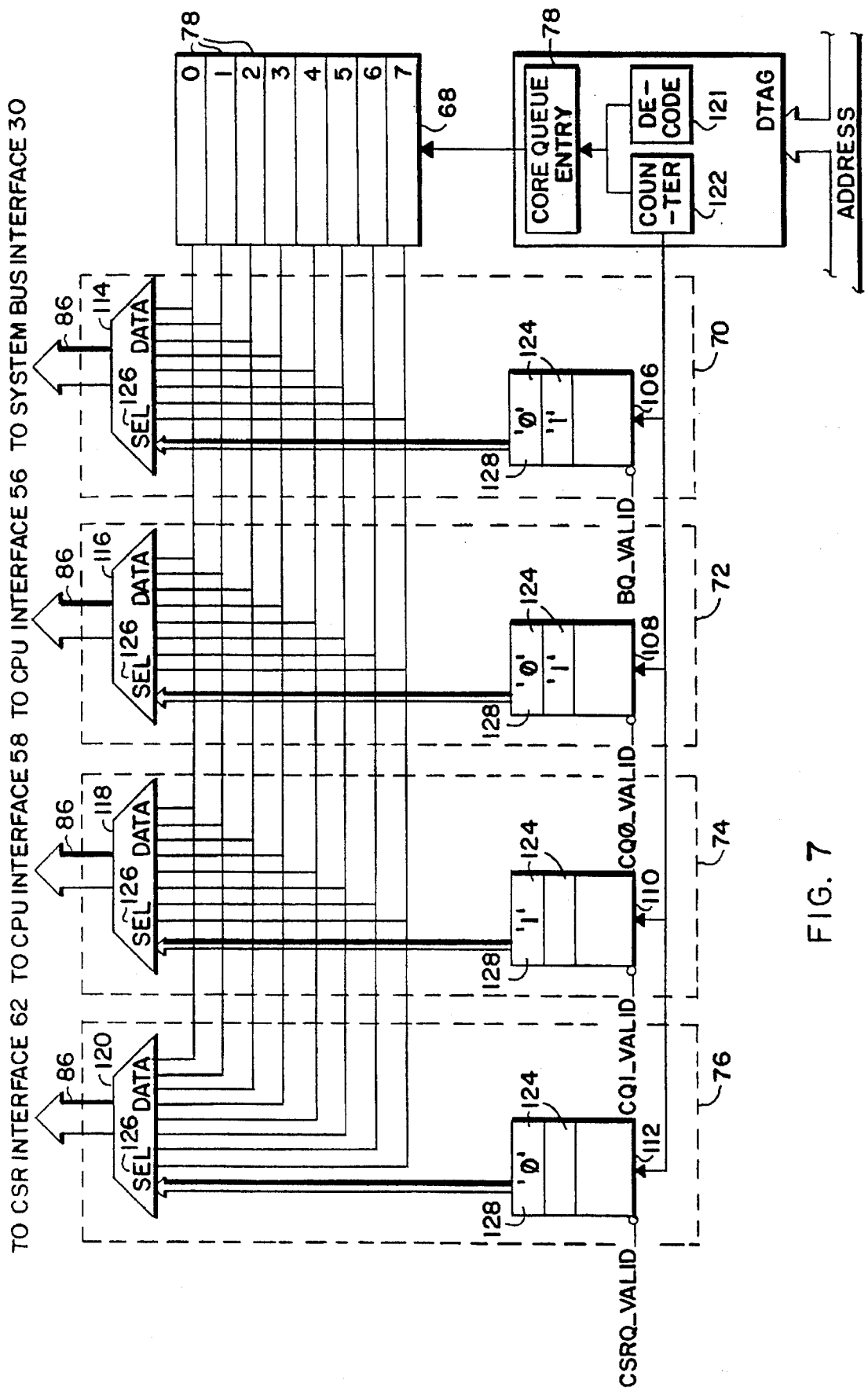
FIG. 7 is a block diagram of the core queue and virtual queues showing the contents of the virtual queue fifos for two outstanding system bus operations.

Referring now to FIG. 7, note that the lead entry (current pointer 128) of the virtual queue FIFO 74 associated with the CPU/cache subsystem 42, points to the core queue entry '1', a subset of which is selected through the virtual queue multiplexer 118 to the CPU interface 58. Meanwhile the current pointers 128 of the virtual queues 70, 72, and 76 point to the core queue entry '0', subsets of which are selected via the virtual queue multiplexers 114, 116 and 120 to the system bus interface 30, CPU interface 56, and CSR interface 62 respectively. Furthermore, the virtual queue entry 86 presented to the CPU interface 58 indicates to the state machine 160 that data should be transferred from the CPU/cache subsystem 42 to the CPU1 transmit buffer 138 when the CPU1 XMT Flag 152 is reset, indicating that the buffer is empty. Assuming the CPU1 XMT Flag 152 is reset, the state machine 160 can proceed with the data transfer. Thus, in this scenario, a data transfer associated with core queue entry '1' is executed in parallel with a data transfer associated with core queue entry '0'.

Upon completion of the data transfer between the CPU/cache subsystem 42 and the system bus interface 30, the state machine 160 asserts the RESET_CQ1_VALID signal on line 170 to reset the CQ1_VALID bit in the core queue entry '1'. Virtual queue entry 86 from the virtual queue 74 associated with the CPU interface 58 is now retired; however, the core queue entry '1' is still pending, awaiting completion of the two data transfers associated with the virtual queue entries 86 from virtual queues 70 and 72.

When the state machine 162 within the CSR interface 62 successfully transfers data between the CSR block 60 and the CSR transmit buffer 142, it sets the CSR XMT Flag 156 within the interlock block 130 and then asserts the RESET_CSR_VALID signal on line 172 to clear the CSR_VALID bit in the core queue entry '0'. The virtual queue entry 86 from the virtual queue 76 associated with the CSR interface 62 is thus retired.

The state machine 164 within the system bus interface 30 responds to the virtual queue entry 86 from the virtual queue 70 and to the setting of the CSR XMT Flag 156 by transferring data from the CSR transmit buffer 142 to the system data bus 38 and to the CPU0 receive buffer 132. The state machine 164 then sets the CPU0 RCV Flag 146 and resets the CSR XMT Flag 156 in the interlock block 130, and resets the BQ_VALID bit within the core queue entry '0'. The core queue entry '0' is still pending, awaiting the data transfer between the system bus interface 30 and the CPU/cache subsystem 40. Meanwhile, the current pointer for virtual queue 70, which is the lead entry of the virtual queue FIFO 106, points to core queue entry '1'. A new virtual queue entry 86 which is a subset of the core queue entry '1' is thereby selected through the virtual queue multiplexer 114 to the system bus interface 30.

The state machine 160 within the CPU interface 56 responds to the virtual queue entry 86 from the virtual queue 72 (still a subset of the core queue entry '0') and to the setting of the CPU0 RCV Flag 146 by transferring CSR read data from the CPU0 receive buffer 132 to the CPU/cache subsystem 40. The state machine 160 then resets the CPU0 RCV Flag 146 in the interlock block 130, and then resets the CQ0_VALID bit within the core queue entry '0'. Since all VALID bits within the core queue entry '0' are now reset, the core queue entry '0' is retired.

Meanwhile, core queue entry '1' for the "read dirty" operation is still pending due to the outstanding virtual queue entries 86 of the virtual queues 70 and 72. However, the transfer of data between the CPU/cache subsystem 42 and the system bus interface 30 has already occurred, in parallel with the "CSR read" operation. Therefore, the CPU1 XMT Flag 152 is already set. Thus, the state machine 164 within the system bus interface 30 can immediately proceed with transferring data from the CPU1 transmit buffer 138 to the system bus and then from the system bus into the CPU0 receive buffer 132. Accordingly, the state machine 164 resets the CPU1 XMT Flag 152 and sets the CPU0 RCV Flag 146 in the interlock block 130, and resets the BQ_VALID bit in the core queue entry '1'.

The state machine 158 within the CPU interface 56, in response to the virtual queue entry 86 from the virtual queue 72 and the setting of the CPU0 RCV Flag 146, transfers the data from the CPU0 receive buffer 132 to the CPU/cache subsystem 40, resets the CPU0 RCV Flag 146 in the interlock block 130, and clears the CQ0_VALID bit. Core queue entry '1' is thus retired. It can be seen that according to the principles of the invention, a command queue is provided which has the parallel data transfer advantages of a multiple queuing structure while only implementing a single circular command queue, thereby also retaining the design area advantages of a single queue structure.

It is apparent that, within the scope of the invention, modifications and different arrangements may be made other than as herein disclosed. For instance, though the means for storing pointers to core queue entries has been described as a FIFO, other storage elements such as register files or SRAMS could be substituted. Also, though the means for selecting virtual queue entries have been described as multiplexers, combinatorial logic can be otherwise arranged to provide this function. The present disclosure is merely illustrative, the invention comprehending all variations thereof.

What is claimed is:

1. A command queuing apparatus for controlling data transfers between a system bus and a plurality of consumers on a node adapted for coupling to a system bus in a computer system, the apparatus comprising:

a core queue containing core queue entries, each core queue entry corresponding to a system bus operation outstanding on the system bus, each core queue entry including consumer information fields specific to each consumer; and a plurality of virtual queues, each virtual queue corresponding to a consumer, each virtual queue having a virtual queue entry, each virtual queue entry comprising a subset of the fields of a core queue entry, the subset of fields including the consumer information fields specific to the consumer corresponding to the virtual queue, each virtual queue entry for processing by the consumer corresponding to the virtual queue to control the transfer of data between the system bus and the consumer.

2. The command queuing apparatus of claim 1 wherein each core queue entry comprises fields including an address field, a command field, and the consumer information fields specific to each consumer.

3. The command queuing apparatus of claim 2 wherein the subset of fields of a core queue entry comprising a virtual queue entry includes the address field, the command field, and the consumer information fields specific to the consumer coupled to the virtual queue having the virtual queue entry.

4. The command queuing apparatus of claim 1 wherein the consumers comprise a plurality of central processing unit (CPU) interfaces and a system bus interface, each CPU interface being coupled to the system bus interface, the system bus interface consumer adapted for coupling to the system bus, and wherein each CPU interface processes its corresponding virtual queue entry to control the transfer of data between the CPU interface and the system bus interface, and wherein the system bus interface processes its corresponding virtual queue entry to control the transfer of data between the system bus interface and the system bus.

5. The command queuing apparatus of claim 4 wherein another consumer is a control and status register (CSR) interface, the CSR interface being coupled to the system bus interface, and wherein the CSR interface processes the corresponding virtual queue entry to control the transfer of data between the CSR interface and the system bus interface.

6. The command queuing apparatus of claim 1 wherein each virtual queue comprises:

means for storing pointers to core queue entries, one of said pointers being a current pointer; and means coupled to the means for storing pointers for selecting a virtual queue entry, the virtual queue entry being a subset of fields of the core queue entry pointed to by the current pointer, said subset of fields including the consumer information fields specific to the consumer to which the virtual queue corresponds.

7. A command queuing apparatus for controlling data transfers between a system bus and a plurality of consumers on a node adapted for coupling to a system bus in a computer system, the apparatus comprising:

a. a core queue containing core queue entries, each core queue entry corresponding to a system bus operation outstanding on the system bus, each core queue entry having fields including consumer information fields specific to each consumer;

b. virtual queues, each virtual queue corresponding to a consumer, each virtual queue comprising:

means for storing pointers to core queue entries, one of said pointers being a current pointer; and means coupled to the means for storing pointers for selecting a virtual queue entry, the virtual queue entry being a subset of fields of the core queue entry pointed to by the current pointer, said subset of fields including the consumer information fields specific to the consumer to which the virtual queue corresponds, each virtual queue entry for processing by the consumer corresponding to the virtual queue to control the transfer of data between the system bus n the consumer.

8. The command queuing apparatus of claim 7 wherein the consumers comprise a plurality of central processing unit (CPU) interfaces and a system bus interface, each CPU interface being coupled to the system bus interface, the system bus interface consumer adapted for coupling to the system bus, and wherein each CPU interface processes its corresponding virtual queue entry to control the transfer of data between the CPU interface and the system bus interface, and wherein the system bus interface processes its corresponding virtual queue entry to control the transfer of data between the system bus interface and the system bus.

9. The command queuing apparatus of claim 8 wherein another consumer is a control and status register (CSR) interface, the CSR interface being coupled to the system bus interface, and wherein the CSR interface processes the corresponding virtual queue entry to control the transfer of data between the CSR interface and the system bus interface.

10. The command queuing apparatus of claim 7 wherein each core queue entry comprises fields including an address field, a command field, and the consumer information fields specific to each consumer.

11. The command queuing apparatus of claim 7 wherein the subset of fields of a core queue entry comprising a virtual queue entry includes the address field, the command field, and the consumer information fields specific to the consumer corresponding to the virtual queue.

12. The apparatus of claim 7 wherein the means for storing pointers is a FIFO and the current pointer is the lead entry in the FIFO, and wherein the means for selecting a subset of fields is a multiplexer having select inputs and multiple data inputs, the select inputs selecting one of the data inputs, each data input comprising a subset of fields of a core queue entry, said subset of fields including the consumer information fields specific to the consumer to which the virtual queue corresponds, the select inputs being coupled to the current pointer so that the multiplexer produces as output a virtual queue entry comprising the subset of fields of the core queue entry pointed to by the current pointer.

13. The apparatus of claim 7 further comprising an interlock block coupled to the virtual queues and to the consumers for transferring data, the interlock block including resource flags, the resource flags indicating the time at which each of the consumers should initiate a data transfer.

14. A command queuing apparatus for controlling data transfers to and from consumers on a node in a computer system, the consumers including a plurality of central processing unit (CPU) interfaces, a control and status register (CSR) interface, and a system bus interface for coupling to a system bus, the apparatus comprising:

a. a core queue containing core queue entries, each core queue entry corresponding to a system bus operation outstanding on the system bus, each core queue entry having fields including an address field, a command field, and consumer information fields specific to each consumer;

b. virtual queues, each virtual queue corresponding to a consumer, each virtual queue comprising:

a FIFO for storing pointers to core queue entries, the lead entry in the FIFO being a current pointer to a core queue entry;

a multiplexer coupled to the FIFO for selecting a virtual queue entry, the multiplexer having select inputs and multiple data inputs, the select inputs selecting one of the data inputs, each data input comprising a subset of fields of a core queue entry, said subset of fields of the core queue entry including the address field, the command field, and the consumer information fields specific to the consumer to which the virtual queue corresponds, the select inputs being coupled to the current pointer so that the multiplexer produces as output a virtual queue entry comprising the subset of fields of the core queue entry pointed to by the current pointer;

c. means coupled to each virtual queue corresponding to a CPU interface for processing the corresponding virtual queue entry and controlling the transfer of data between a corresponding CPU and cache subsystem and the system bus interface in response to the virtual queue entry;

d. a state machine located within the CSR interface for processing its corresponding virtual queue entry and controlling the transfer of data between the CSR interface and the system bus interface in response to the virtual queue entry;

e. a state machine located within the system bus interface for processing its corresponding virtual queue entry and controlling the transfer of data between the system bus interface and the system bus in response to the virtual queue entry; and f. an interlock block coupled to each of the virtual queues and to each of the state machines, the interlock block including resource flags, the resource flags indicating the time at which each of the state machines should initiate a data transfer.

* * * * *